(12) United States Patent
Harris et al.

(10) Patent No.: US 11,494,835 B2
(45) Date of Patent: Nov. 8, 2022

(54) INTELLIGENT AGENT TO SIMULATE FINANCIAL TRANSACTIONS

(71) Applicant: International Business Machines Corporation, Armonk, NY (US)

(72) Inventors: Brandon Harris, Union City, NJ (US); Eugene I. Kelton, Mechanicsburg, PA (US); Chaz Vollmer, Raleigh, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 344 days.

(21) Appl. No.: 16/674,456

(22) Filed: Nov. 5, 2019

(65) Prior Publication Data
US 2021/0133864 A1  May 6, 2021

(51) Int. Cl.
*G06Q 40/00* (2012.01)
*G06Q 40/02* (2012.01)
(Continued)

(52) U.S. Cl.
CPC ............. *G06Q 40/02* (2013.01); *G06F 30/20* (2020.01); *G06N 5/02* (2013.01)

(58) Field of Classification Search
CPC .......... G06Q 40/02; G06F 30/20; G06N 5/02
See application file for complete search history.

(56) References Cited

U.S. PATENT DOCUMENTS 5,949,045 A * 9/1999 Ezawa ................... G06Q 40/08
705/16
6,741,973 B1 * 5/2004 Dove ..................... G06N 3/126
706/13
(Continued)

FOREIGN PATENT DOCUMENTS

| CN | 101075330 A | 11/2007 |
|----|-------------|---------|
| CN | 103236959 A | 8/2013  |

(Continued)

OTHER PUBLICATIONS

Venkataram et al., "An authentication scheme for ubiquitous commerce: A cognitive agents based approach," IEEE 978-1-4244-2067-4/08, 2008 (Year: 2008).*

(Continued)

*Primary Examiner* — Alexander G Kalinowski
*Assistant Examiner* — William B. Bunker
(74) *Attorney, Agent, or Firm* — Troutman Pepper Hamilton Sanders LLP (57) ABSTRACT

Embodiments can provide a computer implemented method for simulating transaction data using a reinforcement learning model including an intelligent agent, a policy engine, and an environment, the method including: providing, by a processor, standard customer transaction data representing a group of customers having similar transaction characteristics as a goal; conducting, by the intelligent agent, an action including a plurality of simulated transactions; comparing, by the environment, the action with the goal; providing a feedback, by the environment, the action based on a degree of similarity relative to the goal; and adjusting, by the policy engine, a policy based on the feedback; the step of conducting an action to the step of adjusting a policy are repeated until the degree of similarity is higher than a first predefined threshold.

14 Claims, 5 Drawing Sheets

(51) Int. Cl.
*G06N 5/02* (2006.01)
*G06F 30/20* (2020.01)

(56) References Cited

U.S. PATENT DOCUMENTS

| | | | |
|---|---|---|---|
| 6,839,682 B1 | 1/2005 | Blume et al. | |
| 7,165,037 B2 | 1/2007 | Lazarus et al. | |
| 8,090,648 B2 | 1/2012 | Zoldi et al. | |
| 8,108,245 B1 | 1/2012 | Hosea et al. | |
| 8,140,502 B2 | 3/2012 | Francis et al. | |
| 8,504,408 B2 * | 8/2013 | Banthia | G06Q 30/02 705/7.29 |
| 9,129,290 B2 | 9/2015 | Kannan et al. | |
| 9,710,365 B2 | 7/2017 | Correll | |
| 9,934,288 B2 | 4/2018 | Aggarwal | |
| 10,469,315 B2 * | 11/2019 | Nair | H04L 43/50 |
| 10,482,466 B1 | 11/2019 | Walters et al. | |
| 10,489,864 B1 | 11/2019 | Werr | |
| 10,521,856 B1 | 12/2019 | Joseph et al. | |
| 10,686,811 B1 | 6/2020 | Ehle | |
| 10,832,249 B1 | 11/2020 | Flowers et al. | |
| 10,949,825 B1 | 3/2021 | Brosamer et al. | |
| 2002/0133721 A1 | 9/2002 | Adjaoute | |
| 2005/0278220 A1 | 12/2005 | Hahn-Carlson et al. | |
| 2007/0106582 A1 | 5/2007 | Baker et al. | |
| 2008/0313017 A1 | 12/2008 | Totten | |
| 2009/0183143 A1 | 7/2009 | Li et al. | |
| 2009/0210368 A1 | 8/2009 | Deo et al. | |
| 2010/0153184 A1 | 6/2010 | Caffrey et al. | |
| 2012/0284080 A1 | 11/2012 | De Oliveira et al. | |
| 2013/0139003 A1 * | 5/2013 | Patwardhan | G06F 11/3684 714/32 |
| 2013/0191531 A1 | 7/2013 | Kruglick | |
| 2013/0282542 A1 | 10/2013 | White | |
| 2014/0058763 A1 | 2/2014 | Zizzamia et al. | |
| 2014/0074614 A1 | 3/2014 | Mehanian et al. | |
| 2014/0222506 A1 | 8/2014 | Frazer et al. | |
| 2014/0314225 A1 | 10/2014 | Riahi et al. | |
| 2015/0039435 A1 | 2/2015 | Shahee | |
| 2015/0127455 A1 | 5/2015 | Penzotti et al. | |
| 2015/0178825 A1 | 6/2015 | Huerta et al. | |
| 2016/0155136 A1 | 6/2016 | Zhang et al. | |
| 2016/0170778 A1 | 6/2016 | Anpur | |
| 2016/0239857 A1 | 8/2016 | Milton et al. | |
| 2016/0267483 A1 | 9/2016 | Jenson | |
| 2017/0124487 A1 | 5/2017 | Szeto et al. | |
| 2017/0148042 A1 | 5/2017 | Sullivan et al. | |
| 2017/0236131 A1 | 8/2017 | Nathenson et al. | |
| 2018/0081787 A1 * | 3/2018 | Riddick | G06Q 20/00 |
| 2018/0089442 A1 | 3/2018 | Kenthapadi et al. | |
| 2018/0240036 A1 | 8/2018 | Boada et al. | |
| 2018/0293498 A1 | 10/2018 | Campos et al. | |
| 2018/0365674 A1 * | 12/2018 | Han | G06N 7/06 |
| 2019/0057400 A1 | 2/2019 | Nair et al. | |
| 2019/0073669 A1 | 3/2019 | Dutta et al. | |
| 2019/0095924 A1 | 3/2019 | Adjaoute | |
| 2019/0279218 A1 * | 9/2019 | Adjaoute | G06Q 20/4016 |
| 2019/0295001 A1 | 9/2019 | Fusco et al. | |
| 2019/0370812 A1 | 12/2019 | Kandasamy et al. | |
| 2019/0377902 A1 | 12/2019 | Schroeder et al. | |
| 2020/0019864 A1 | 1/2020 | Gu et al. | |
| 2020/0027045 A1 * | 1/2020 | Saarenvirta | G06Q 10/06393 |
| 2020/0167686 A1 | 5/2020 | Mallya Kasaragod et al. | |
| 2020/0175759 A1 | 6/2020 | Russell et al. | |
| 2020/0242669 A1 | 7/2020 | Carroll et al. | |
| 2020/0273052 A1 | 8/2020 | Ganti et al. | |
| 2020/0387752 A1 | 12/2020 | Kursun | |
| 2021/0049456 A1 | 2/2021 | Kursun | |
| 2021/0264448 A1 * | 8/2021 | Harris | G06N 3/006 |

FOREIGN PATENT DOCUMENTS

| | | | | |
|---|---|---|---|---|
| CN | 109614301 A | 4/2019 | | |
| CN | 110008696 A | 7/2019 | | |
| CN | 110009171 A | 7/2019 | | |
| WO | WO-9901833 A1 * | 1/1999 | | G06Q 20/20 |
| WO | 2007147166 A1 | 12/2007 | | |
| WO | WO-2007143059 A2 * | 12/2007 | | G06F 21/554 |
| WO | 2018194707 A1 | 10/2018 | | |
| WO | WO-2018194707 A1 * | 10/2018 | | G06Q 20/4016 |

OTHER PUBLICATIONS

Rieke et al., "Fraud Detection in Mobile Payments Utilizing Process Behavior Analysis," 2013 International Conference on Availability, Reliability and Security, 2013 (Year: 2013).*

Aggarwal, Yu. "A Condensation Approach to Privacy Preserving Data Mining." Lecture Notices in Computer Science. Mar. 2004.

International Search Report and Written Opinion dated Feb. 19, 2021 in related International Patent Application Serial No. PCT/IB2020/060268.

International Search Report and Written Opinion dated Feb. 19, 2021 in related International Patent Application Serial No. PCT/IB2020/060267.

Non-Final Office Action dated Apr. 13, 2021 in related U.S. Appl. No. 16/674,457.

Non-Final Office Action dated Apr. 28, 2021 in related U.S. Appl. No. 16/674,451.

Non-Final Office Action dated Apr. 28, 2021 in related U.S. Appl. No. 16/674,452.

Bruwer, "Domain-specific market segmentation using a latent class mixture modelling approach and wine-related lifestyle (WRL) algorithm," 2017, European Journal of Marketing, vol. 51, No. 9/10, pp. 1552-1576—directed to disclosing use of unsupservised learning algorithsm to find clusters or segments of marketing data in PCA (principal components analysis) and LCA (latent class analysis) (See p. 1556).

Nov. 5, 2019, U.S. Appl. No. 16/674,451, 20210133586.
Nov. 5, 2019, U.S. Appl. No. 16/674,452, 20210133488.
Nov. 5, 2019, U.S. Appl. No. 16/674,454, 20210133783.
Nov. 5, 2019, U.S. Appl. No. 16/674,457, 20210133892.
Nov. 5, 2019, U.S. Appl. No. 16/674,459, 20210133771.
Nov. 5, 2019, U.S. Appl. No. 16/674,462, 20210133489.
Nov. 5, 2019, U.S. Appl. No. 16/674,464, 20210133644.
Nov. 5, 2019, U.S. Appl. No. 16/674,467, 20210133490.
Nov. 5, 2019, U.S. Appl. No. 16/674,468, 20210133751.
Nov. 5, 2019, U.S. Appl. No. 16/674,472, 20210133772.
Nov. 5, 2019, U.S. Appl. No. 16/674,474, 20210133752.

Amarasinghe, "Critical analysis of machine learning based approaches for fraud detection in financial transactions," 2018, In Proceedings of the 2018 International Conference on Machine Learning Technologies, pp. 12-17 (Year 2018).

Customer Segmentation Based on RFM Model and Clustering Techniques With K-Means Algorithm Maryani et al. [referred to in corresponding OA of U.S. Appl. No. 16/674,462 dated Jul. 14, 22 as, Maryani, I. and Riana, D., Aug. 2017. Clustering and profiling of customers using RFM for customer relationship management recommendations. In 2017 5th International Conference on Cyber and IT Service Management (CITSM) (pp. 1-6). IEEE (Year: 2017)].

Non-Final Rejection Issued in co-pending U.S. Appl. No. 16/674,462 dated Jul. 14, 2022.

* cited by examiner

| Location ID | Date | Vendor Name | Product Type | Item Amount | Customer First Name | Customer Last Name | 2nd Party First Name | 2nd Party Last Nme |
|---|---|---|---|---|---|---|---|---|
| 800 | 1/1/2014 | UniGram | ACH RECEIVE | 12387.71 | James | Culley | James | Dewitt |
| 19 | 1/3/2014 | UniGram | CHK CARD POS | 474.98 | James | Culley | Anna | Erickson |
| 2262 | 1/3/2014 | UniGram | CHK CARD POS | 4400 | James | Culley | Jimmy | Madrid |
| 2262 | 1/4/2014 | UniGram | CHK CARD POS | 3856.55 | James | Culley | Anna | Erickson |
| 479 | 2/1/2014 | UniGram | ACH RECEIVE | 12387.71 | James | Culley | Gennie | Walkup |
| 3277 | 2/2/2014 | UniGram | CHK CARD POS | 4500 | James | Culley | Jimmy | Madrid |
| 3277 | 2/3/2014 | UniGram | CHK CARD POS | 1713.91 | James | Culley | Gennie | Walkup |
| 1548 | 6/27/2014 | UniGram | TRANSFER SEND | 8100 | James | Culley | Willie | Bryant |

INTELLIGENT AGENT TO SIMULATE FINANCIAL TRANSACTIONS

TECHNICAL FIELD

The present invention relates generally to a cognitive system implementing a transaction data simulator, and more particularly to implementing a transaction data simulator configured to simulate financial transactions.

BACKGROUND

A financial crime detection system, e.g., IBM® Financial Crimes Alerts Insight with Watson™, can utilize cognitive analytics to help banks to detect money laundering and terrorist financing. The cognitive analytics differentiate "normal" financial activities from "suspicious" activities, and use the differentiation information to build a predictive model for banks. A large set of real financial customer data is required to train the predictive model.

Since the real customer data is very sensitive, only a limited amount of real customer data can be provided by banks. However, in order to best simulate fraudulent situations and detect different types of financial crimes, more simulated customer data, e.g., transaction data for training, which looks realistically, could produce a better predictive model.

SUMMARY

Embodiments provide a computer implemented method in a data processing system comprising a processor and a memory comprising instructions, which are executed by the processor to cause the processor to implement the method for simulating transaction data using a reinforcement learning model including an intelligent agent, a policy engine, and an environment. The method includes: providing, by the processor, standard customer transaction data representing a group of customers having similar transaction characteristics as a goal; conducting, by the intelligent agent, an action including a plurality of simulated transactions; comparing, by the environment, the action with the goal; providing, by the environment, a feedback associated with the action based on a degree of similarity relative to the goal; and adjusting, by the policy engine, a policy based on the feedback; the step of conducting an action to the step of adjusting a policy are repeated until the degree of similarity is higher than a first predefined threshold.

Embodiments further provide a computer implemented method, further comprising: acquiring, by the processor, the standard customer transaction data from raw customer data through an unsupervised clustering approach.

Embodiments further provide a computer implemented method, wherein each simulated transaction includes one or more of transaction type, transaction amount, transaction time, transaction location, transaction medium, and a second party associated with the simulated transaction.

Embodiments further provide a computer implemented method, wherein the environment includes a set of all previous actions conducted by the intelligent agent.

Embodiments further provide a computer implemented method, further comprising: adding, by the processor, the action in a present iteration into the environment.

Embodiments further provide a computer implemented method, further comprising: removing, by the processor, a plurality of previous actions having the degree of similarity lower than a second predefined threshold.

Embodiments further provide a computer implemented method, wherein the feedback is a reward or a penalty.

In another illustrative embodiment, a computer program product comprising a computer usable or readable medium having a computer readable program is provided. The computer readable program, when executed on a processor, causes the processor to perform various ones of, and combinations of, the operations outlined above with regard to the method illustrative embodiment.

In yet another illustrative embodiment, a system is provided. The system may comprise a training data harvesting processor configured to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ is an example of one such cognitive system which can process human readable language and identify inferences between text passages with human-like accuracy at speeds far faster than human beings and on a much larger scale. In general, such cognitive systems are able to perform the following functions:

- Navigate the complexities of human language and understanding
- Ingest and process vast amounts of structured and unstructured data
- Generate and evaluate hypotheses
- Weigh and evaluate responses that are based only on relevant evidence Provide situation-specific advice, insights, and guidance Improve knowledge and learn with each iteration and interaction through machine learning processes Enable decision making at the point of impact (contextual guidance)

Scale in proportion to the task

Extend and magnify human expertise and cognition

Identify resonating, human-like attributes and traits from natural language

Deduce various language specific or agnostic attributes from natural language

High degree of relevant recollection from data points (images, text, voice) (memorization and recall)

Predict and sense with situation awareness that mimics human cognition based on experiences Answer questions based on natural language and specific evidence In one aspect, the cognitive system can be augmented with a transaction data simulator, to simulate a set of customer transaction data from a financial institution, e.g., a bank. The simulated customer transaction data, even if it is not "actual" customer transaction data from the financial institution, can be used to train the predictive model for identifying financial crimes.

The transaction data simulator combines a multi-layered unsupervised clustering approach with interactive reinforcement learning (IRL) model to create a large set of intelligent agents that have learned to behave like "standard customers."

In an embodiment, the multi-layered unsupervised clustering approach creates a large set of standard customer transaction behaviors (extracted from real customer transaction data provided by a bank), using information including hundreds of attributes of "standard customers" over varying periods of time. Each standard customer transaction behavior can be associated with a group of customers having similar transaction characteristics. An intelligent agent generates an artificial customer profile, and selects one of standard customer transaction behaviors to be combined with the generated artificial customer profile. In this way, the intelligent agent can simulate a "standard customer," and learn to behave like the "standard customer." The intelligent agent is then provided with a period of time (e.g., ten years), during which the intelligent agent can observe an environment, e.g., past behaviors of the represented "standard customer") and learn to perform "fake" customer transactions which are similar to standard customer transaction behavior of the represented "standard customer." Each factor of the standard customer transaction behavior can be statistic data. For example, the transaction amount of the standard customer transaction behavior can be a range of values, e.g., the transaction amount of the standard customer transaction behavior is $20-$3,000. The transaction location of the standard customer transaction behavior can be provided statistically, e.g., 30% of transaction locations are shopping malls, 50% of transaction locations are restaurants, and 20% of transaction locations are gas stations. The transaction type of the standard customer transaction behavior can be provided statistically, e.g., 20% of transaction types are check payment, 40% of transaction types are POS payment, 25% of transaction types are ATM withdrawal, and 15% of transaction types are wire transfer. The transaction medium of the standard customer transaction behavior can be provided statistically, e.g., 15% of transaction mediums are cash, 45% of transaction mediums are credit card, 25% of transaction mediums are checking accounts, and 15% of transaction mediums are PayPal®.

In an embodiment, a large number of artificial customer profiles are generated from a plurality of real customer profile data. The real customer profile data can be provided by one or more banks. Each real customer profile can include an address of a customer; a name of a customer (the customer can be a legal entity or individual); contact information such as a phone number, an email address, etc.; credit information, such as a credit score, a credit report, etc.; income information (e.g., an annual revenue of a legal entity, or a wage of an individual), and the like. The real customer profile data are stored under different categories. For example, commercial customers (i.e., legal entities) can be divided into different categories based on the size, product or service of the commercial customers. An artificial customer profile can be generated by randomly searching all the real customer profile data. For example, an artificial customer profile can be generated by combining randomly selected information including address, first name, second name, phone number, email address, credit score, revenue or wage, etc. Thus, the generated artificial customer profile extracts different pieces of information from real customer profile data, and thus looks like a realistic customer profile. Financial transaction data is further simulated associated with each artificial customer profile.

In an embodiment, to protect privacy of real customers, composite information, such as an address, a name, etc. can be split into a plurality of parts before the random selection. For example, the address "2471 George Wallace Street" can be parsed into 3 parts: [number] "2471," [name] "George Wallace," and [suffix] "Street." These parts can be randomly selected individually to form an artificial customer profile. In a further embodiment, the composite information of an artificial customer profile, such as an address, a name, etc. is compared to the composite information of a real customer profile. If the similarity degree is greater than a predefined threshold value, then the artificial customer profile is unacceptable and needs to be updated until the similarity degree is less than the predefined threshold value.

Figure 1:
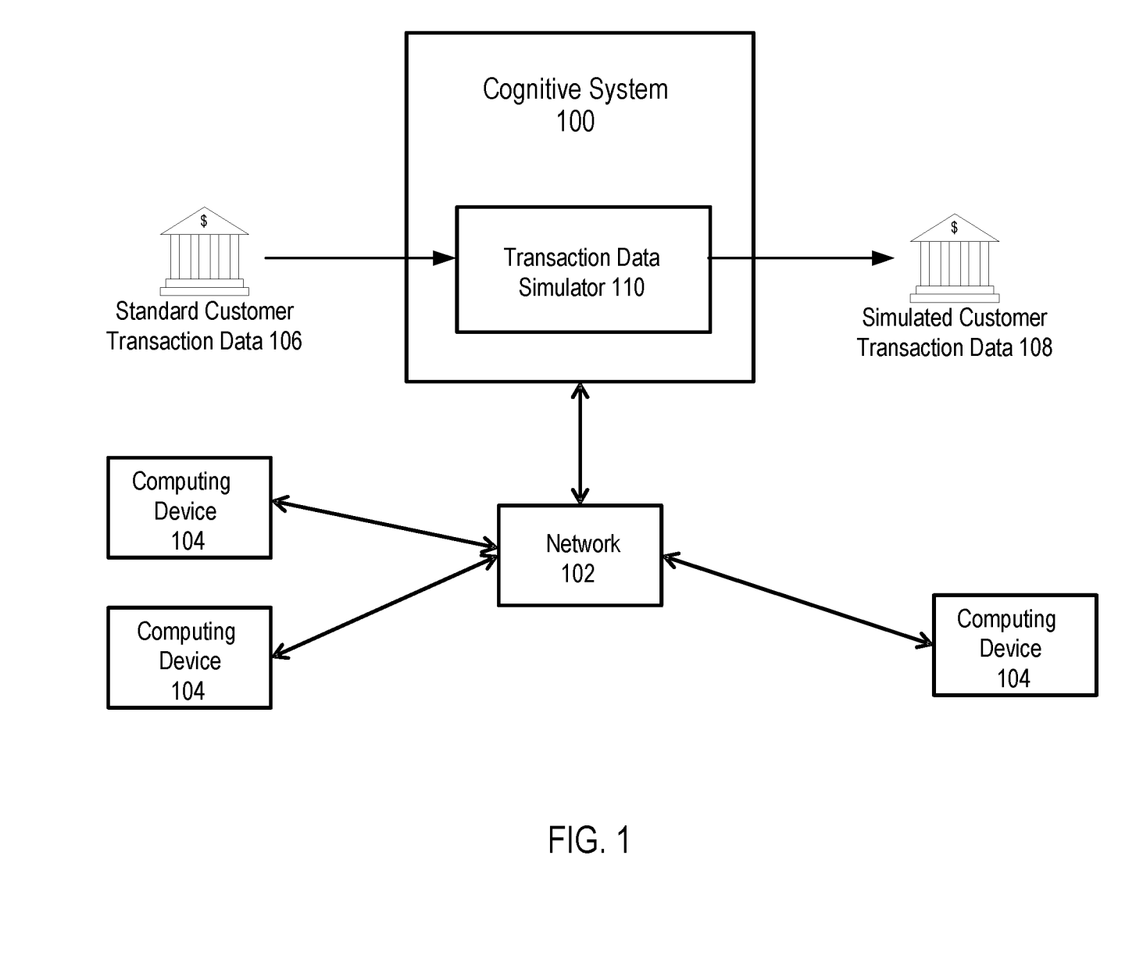
FIG. 1 depicts a schematic diagram of one illustrative embodiment of a cognitive system 100 implementing transaction data simulator in a computer network.

FIG. 1 depicts a schematic diagram of one illustrative embodiment of a cognitive system 100 implementing transaction data simulator 110 in a computer network 102. The cognitive system 100 is implemented on one or more computing devices 104 (comprising one or more processors and one or more memories, and potentially any other computing device elements generally known in the art including buses, storage devices, communication interfaces, and the like) connected to the computer network 102. The computer network 102 includes multiple computing devices 104 in communication with each other and with other devices or components via one or more wired and/or wireless data communication links, where each communication link comprises one or more of wires, routers, switches, transmitters, receivers, or the like. Other embodiments of the cognitive system 100 may be used with components, systems, subsystems, and/or devices other than those that are depicted herein. The computer network 102 includes local network connections and remote connections in various embodiments, such that the cognitive system 100 may operate in environments of any size, including local and global, e.g., the Internet. The cognitive system 100 is configured to implement transaction data simulator 110 that can simulate standard customer transaction data 106 (i.e., a standard customer transaction behavior). The transaction data simulator 110 can generate a large set of simulated customer transaction data 108 based on the standard customer transaction data 106, so that the simulated customer transaction data 108 looks like real customer transaction data. In an embodiment, the standard customer transaction data 106 is obtained through unsupervised clustering approach. Raw customer data including a large amount of customer transaction data is provided by one or more banks, and a large set of small groups representing different characteristics of bank customers are clustered or grouped from the raw customer data through unsupervised clustering approach. Each small group includes transaction data from customers having similar characteristics. For example, group A represents customers who are single attorneys practicing patent law in New York, while group B represents customers who are married attorneys practicing commercial law in New York.

Figure 2:
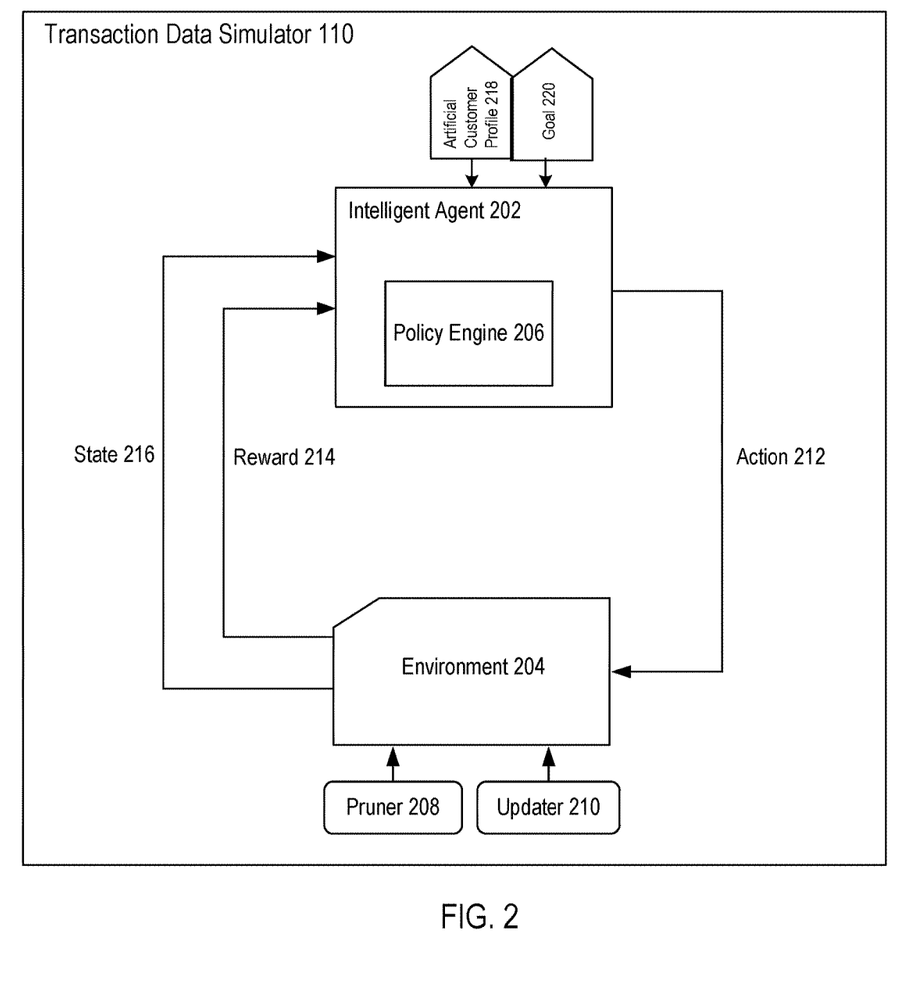
FIG. 2 depicts a schematic diagram of one illustrative embodiment of the transaction data simulator 110.
Figure 3:
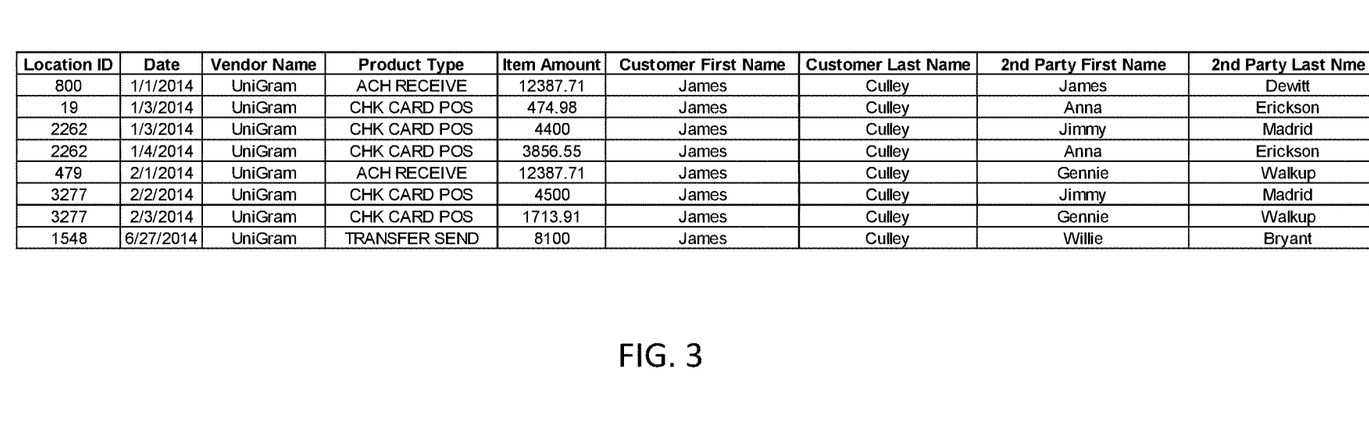
FIG. 3 depicts a schematic diagram showing a plurality of simulated transactions from a simulated customer, according to embodiments herein.

FIG. 2 depicts a schematic diagram of one illustrative embodiment of the transaction data simulator 110. The transaction data simulator 110 utilizes reinforcement learning techniques to simulate financial transaction data. The transaction data simulator 110 includes intelligent agent 202, and environment 204. The intelligent agent 202 randomly selects a standard transaction behavior 220 (i.e. goal 220) representing a group of "customers" having similar transaction characteristics, and associates the standard transaction behavior with a randomly selected artificial customer profile 218. The intelligent agent 202 takes an action 212 in each iteration. In this embodiment, the action 212 taken in each iteration includes conducting a plurality of transactions in a single day. Each transaction has the information including transaction type (e.g., Automated Clearing House (ACH) transfer, check payment, Wire transfer, Automated Teller Machine (ATM) withdrawal, Point of Sale (POS) payment, etc.); transaction amount; transaction time; transaction location; transaction medium (e.g., cash, credit card, debit card, PayPal®, checking account, etc.); the second party who is related to the transaction (e.g., a person who receives the wire transferred payment), and the like. The environment 204 takes the action 212 as input, and returns reward 214 (or feedback) and state 216 from environment 204 as the output. The reward 214 is the feedback by which the success or failure of the action 212 is measured. In this embodiment, the environment 204 compares the action 212 with goal 220 (e.g., standard transaction behavior). If the action 212 deviates from the goal 220 beyond a predefined threshold, then the intelligent agent 202 is penalized, while if the action 212 deviates from the goal 220 within a predefined threshold (i.e., the action 212 is similar to the goal 220), the intelligent agent 202 is rewarded. The action 212 is effectively evaluated, so that the intelligent agent 202 can improve the next action 212 based on the reward 214. In this embodiment, the environment 204 is a set of all old actions taken by the intelligent agent 202, i.e., the environment 204 is a set of all old simulated transactions. The intelligent agent 202 observes the environment 204, and gets information about the old transactions, e.g., the number of transactions that have been made within a day, a week, a month, or a year; each transaction amount, account balance, each transaction type, and the like. The policy engine 206 can adjust the policy based on the observations, so that the intelligent agent 202 can take a better action 212 in the next iteration.

The intelligent agent 202 further includes policy engine 206, configured to adjust a policy based on the state 216 and the reward 214. The policy is a strategy that the intelligent agent 202 employs to determine the next action 212 based on the state 216 and the reward 214. The policy is adjusted, aiming to get a higher reward 214 for the next action 212 taken by the intelligent agent 202. The policy includes a set of different policy probabilities or decision-making probabilities which can be used to decide whether a transaction is going to be performed in a particular day or not, the number of transactions per day, transaction amount, transaction type, transaction party, etc. In reinforcement learning model, outcome of events are random, and a random number generator (RNG) is a system that generates random numbers from a true source of randomness. In an example, the maximum number of transactions per day is 100, and the maximum transaction amount is $15 million. In the first iteration, a random transaction with transaction amount of $15 million to Zimbabwe is made by the intelligent agent 202. This action 212 deviates far from the goal 220 (e.g., transaction made by married attorneys practicing commercial law in Maine), and thus this action 212 is penalized (i.e., the reward 214 is negative). The policy engine 206 is trained to adjust the policy, so that a different transaction which is closer to the goal 220 can be made. With more iterations, transactions which are similar to the goal 220 can be simulated by the "smarter" policy engine 206. As shown in FIG. 3, a plurality of transactions from the customer "James Culley" are simulated, and the simulated transaction data is similar to the goal 220.

As shown in FIG. 2, in an embodiment, one feedback loop (i.e., one iteration) corresponds to one "day" of actions (i.e., one "day" of simulated transactions). During a period of time, e.g., ten years, the intelligent agent 202 learns how to take an action 212 to get a reward 214 as high as possible. The number of iterations corresponds to the duration of time. For example, ten years correspond to 10×365=3650 iterations. Reinforcement learning model judges the actions 212 by the results that the actions 212 produce. It is goal 220 oriented, and its aim is to learn sequences of actions 212 that will lead the intelligent agent 202 to achieve its goal 220, or maximize its objective function.

In an embodiment, the transaction data simulator 110 further includes updater 210. A new action 212 is performed in each iteration. The updater 210 updates the environment 204 with the action 212 taken by the intelligent agent 202 after each iteration. The action 212 taken in each iteration is added into the environment 204 by the updater 210. In an embodiment, the transaction data simulator 110 further includes pruner 208, configured to prune the environment 204. In an embodiment, the pruner 208 can remove one or more undesired actions. For example, actions 212 which are taken in the first ten iterations are removed, because these ten iterations deviate far from the goal 220, and the degree of similarity is below a predefined threshold. In another embodiment, a full re-initialization of the transaction data simulator 110 can be performed to remove all the accumulated actions in the environment 204, so that the intelligent agent 202 can start over again.

Figure 4:
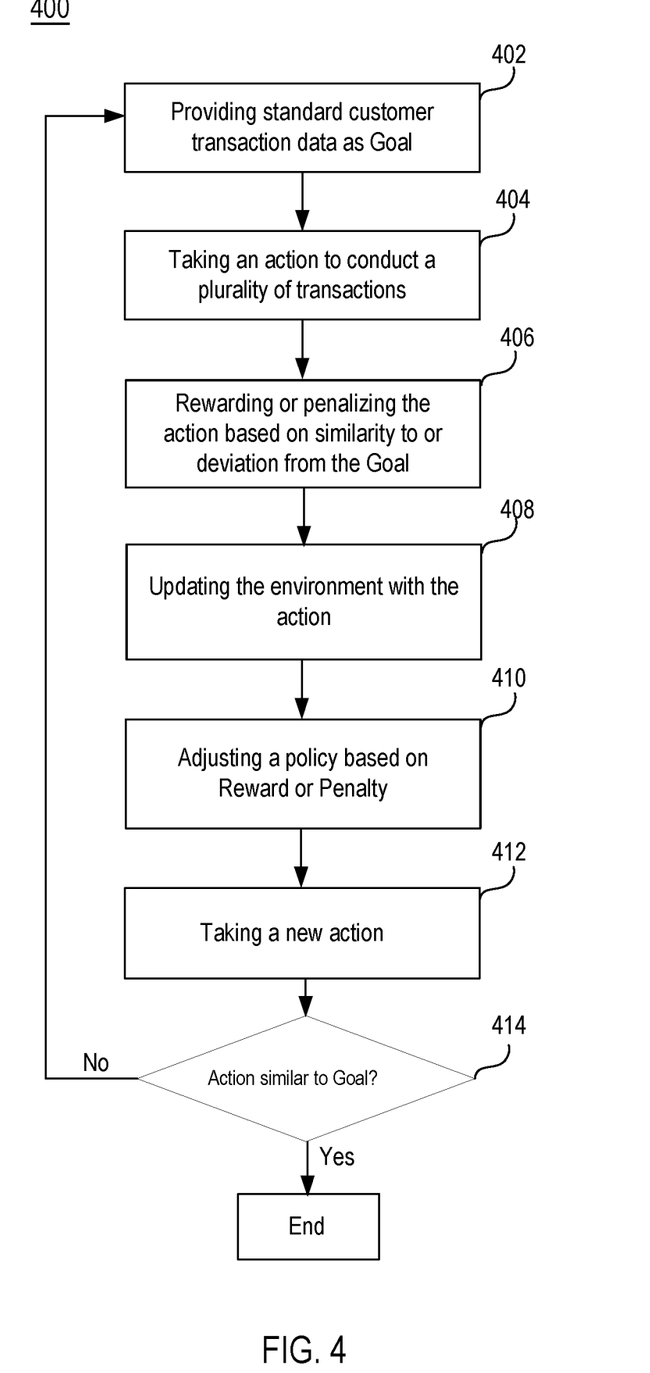
FIG. 4 illustrates a flow chart of one illustrative embodiment of a method 400 of simulating transaction data.

FIG. 4 illustrates a flow chart of one illustrative embodiment showing a method 400 of simulating transaction data. At step 402, standard customer transaction behavior data is provided as goal 220. The standard customer transaction behavior represents a group of customers having similar transaction characteristics. The standard customer transaction behavior is obtained through unsupervised clustering approach.

At step 404, an action 212 is taken to conduct a plurality of transactions in an iteration representing e.g., a single day (e.g., 100 transactions per day). Each transaction has the information including transaction type, transaction amount, transaction time, transaction location, transaction medium, the second party who is associated with the transaction, and the like.

At step 406, the environment 204 compares the goal 220 with the action 212 taken in this iteration, rewards or penalizes the action 212 based on similarity to or deviation from the goal 220. The threshold or rule to decide whether the action 212 is similar to the goal 220 or not, is predefined, and can be adjusted based on how similar to the goal 220 the user prefers.

At step 408, the environment 204 is updated to include the action 212 in the present iteration. The environment 204 includes a set of all old actions.

At step 410, the policy engine 206 adjusts a policy for determining the next action 212 based on the reward 214 (i.e., reward or penalty). The policy is made based on a variety of factors, e.g., probability of occurrence of a transaction, the number of transactions per day, transaction amount, transaction type, transaction party, transaction frequency of each transaction type, an upper bound and a lower bound for each transaction, transaction medium, and the like. The policy can adjust weights of these factors based on the reward 214 in each iteration.

At step 412, in a new iteration, the intelligent agent 202 takes a new action 212. The steps 404 to 412 are repeated until the action 212 is similar enough to the goal 220 (step 414). For example, the transaction amount specified in the goal 220 is $20-$3,000. If the transaction amount of each transaction in the action 212 falls within the range of $20-$3,000, then the action 212 is similar enough to the goal 220.

Since the standard customer transaction data 106 may include abnormal data, e.g., a fraudulent transaction, the simulated customer transaction data 108 may also include abnormal data, because the simulated customer transaction data 108 is similar to the standard customer transaction data 106. In reinforcement learning model, the intelligent agent 202 explores the environment 204 randomly or stochastically, learns a policy from its experiences, and updates the policy as it explores to improve the behavior (i.e., transaction) of the intelligent agent 202. In an embodiment, a behavioral pattern (e.g., spending "splurges" until running out of savings, or experiencing "buyer's remorse" on one big purchase, etc.), as opposed to random actions, may emerge during RNG based exploration. An abnormal behavioral pattern may indicate a fraudulent transaction. For example, a simulated customer James Culley may generally make transactions having a transaction amount below $1,000. Suddenly, there is a transaction having a transaction amount of $5,000, and this suspicious transaction may be a fraudulent transaction (e.g., the credit card of James Culley is stolen, or the checking account of James Culley is hacked).

There is a behavioral pattern that naturally emerges during exploration. For example, as shown in FIG. 3, the simulated customer James Culley received an amount of $12,387.71 in a checking account on Jan. 1, 2014. James Culley spent $474.98 on Jan. 3, 2014, $4,400 on January 3, and $3,856.55 on Jan. 4, 2014 through a debit card associated with the checking account. In the next Month, James Culley received an amount of $12,387.71 in the checking account on Feb. 1, 2014. James Culley spent $4,500 on Feb. 2, 2014, and $1,713.91 on February 3 through the debit card associated with the checking account, and transferred $8,100 out of the checking account on Jun. 27, 2014. In this example, this simulated customer James Culley has a tendency of save-and-spend, and occasionally has a big purchase. The behavioral pattern makes this simulated customer James Culley behave more realistically (i.e., look more like a real customer, rather than a robot). A plurality of parameters, such as "behavioral consistency" (the degree of behavioral consistency in a period of time), "consistency volatility" (frequency of behavior change), "behavior abnormality" (deviation from regular transaction behaviors), etc. are generated by the policy engine 206, and used to show a different personality of each simulated customer.

The transaction data simulator 110 uses abstracted or aggregated real customer data to simulate customer data that is representative of real customers. The transaction data simulator 110 can provide a large set of simulated customer data (i.e., simulated transaction data in combination with an artificial customer profile) that can be used to train a predictive model for detecting abnormal customer behaviors. Further, the simulated customer data is generated based on abstracted data of the real raw customer data, rather than the real raw customer data itself, and thus it is impossible to derive actual transaction actions of any real customer. Additionally, the transaction data simulator 110 allows generation of a behavioral pattern for each simulated customer during iterations.

Figure 5:
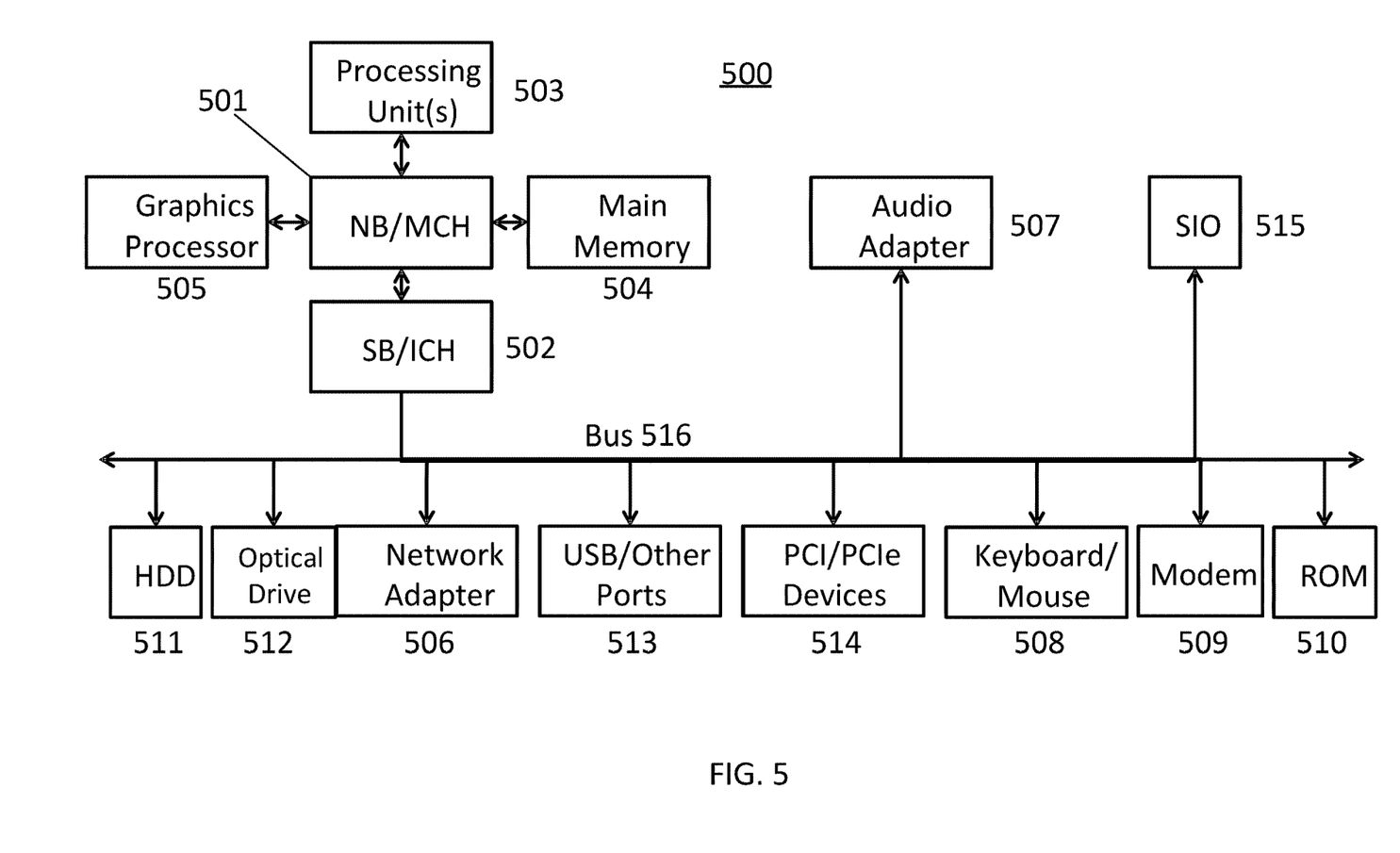
FIG. 5 is a block diagram of an example data processing system 500 in which aspects of the illustrative embodiments may be implemented.

FIG. 5 is a block diagram of an example data processing system 500 in which aspects of the illustrative embodiments are implemented. Data processing system 500 is an example of a computer, such as a server or client, in which computer usable code or instructions implementing the process for illustrative embodiments of the present invention are located. In one embodiment, FIG. 5 represents a server computing device, such as a server, which implements the cognitive system 100 described herein.

In the depicted example, data processing system 500 can employ a hub architecture including a north bridge and memory controller hub (NB/MCH) 501 and south bridge and input/output (I/O) controller hub (SB/ICH) 502. Processing unit 503, main memory 504, and graphics processor 505 can be connected to the NB/MCH 501. Graphics processor 505 can be connected to the NB/MCH 501 through, for example, an accelerated graphics port (AGP).

In the depicted example, a network adapter 506 connects to the SB/ICH 502. An audio adapter 507, keyboard and mouse adapter 508, modem 509, read only memory (ROM) 510, hard disk drive (HDD) 511, optical drive (e.g., CD or DVD) 512, universal serial bus (USB) ports and other communication ports 513, and PCI/PCIe devices 514 may connect to the SB/ICH 502 through bus system 516. PCI/PCIe devices 514 may include Ethernet adapters, add-in cards, and PC cards for notebook computers. ROM 510 may be, for example, a flash basic input/output system (BIOS). The HDD 511 and optical drive 512 can use an integrated drive electronics (IDE) or serial advanced technology attachment (SATA) interface. A super I/O (SIO) device 515 can be connected to the SB/ICH 502.

An operating system can run on processing unit 503. The operating system can coordinate and provide control of various components within the data processing system 500. As a client, the operating system can be a commercially available operating system. An object-oriented programming system, such as the Java™ programming system, may run in conjunction with the operating system and provide calls to the operating system from the object-oriented programs or applications executing on the data processing system 500. As a server, the data processing system 500 can be an IBM® eServer™ System p® running the Advanced Interactive Executive operating system or the LINUX® operating system. The data processing system 500 can be a symmetric multiprocessor (SMP) system that can include a plurality of processors in the processing unit 503. Alternatively, a single processor system may be employed.

Instructions for the operating system, the object-oriented programming system, and applications or programs are located on storage devices, such as the HDD 511, and are loaded into the main memory 504 for execution by the processing unit 503. The processes for embodiments of the cognitive system 100, described herein, can be performed by the processing unit 503 using computer usable program code, which can be located in a memory such as, for example, main memory 504, ROM 510, or in one or more peripheral devices.

A bus system 516 can be comprised of one or more busses. The bus system 516 can be implemented using any type of communication fabric or architecture that can provide for a transfer of data between different components or devices attached to the fabric or architecture. A communication unit such as the modem 509 or the network adapter 506 can include one or more devices that can be used to transmit and receive data.

Those of ordinary skill in the art will appreciate that the hardware depicted in FIG. 5 may vary depending on the implementation. Other internal hardware or peripheral devices, such as flash memory, equivalent non-volatile memory, or optical disk drives may be used in addition to or in place of the hardware depicted. Moreover, the data processing system 500 can take the form of any of a number of different data processing systems, including but not limited to, client computing devices, server computing devices, tablet computers, laptop computers, telephone or other communication devices, personal digital assistants, and the like. Essentially, data processing system 500 can be any known or later developed data processing system without architectural limitation.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112 (f), unless the element is expressly recited using the phrase "means for."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java™, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A computer implemented method for simulating financial transactions, wherein the method is implemented in a data processing system comprising a processor and a memory comprising instructions, which are executed by the processor to cause the processor to implement the method for simulating transaction data using a reinforcement learning model including an intelligent agent, a policy engine, and an environment, the method comprising:

receiving, by the processor, from a financial institution, customer transaction data;

extracting, by the processor using a clustering algorithm, from the customer transaction data, standard customer transaction behaviors, wherein the behaviors comprise a plurality of attributes of a group of customers having similar transaction characteristics as a goal, wherein each member of the group of customers has similar financial, demographic, and geographic attributes, wherein the goal comprises a plurality of transaction factors comprising statistical data, wherein each customer in the group of customers is represented by an artificial customer profile randomly generated from actual customer profile data;

randomly associating, by the processor, each standard transaction behavior with one of the artificial customer profiles; and performing, by the processor, for each artificial customer profile, a plurality of transaction iterations to simulate the standard customer transaction behavior, wherein each iteration comprises a financial transaction associated with each artificial customer profile having randomly generated transaction factors, wherein the plurality of iterations is performed until a degree of similarity of simulated transaction data relative to the standard customer transaction behavior is higher than a first predefined threshold, wherein the threshold is defined by a range of values for the transaction factors for each iteration; wherein each iteration comprises:

conducting, by the intelligent agent, an action including a plurality of simulated transactions executed during a defined time period and in accordance with a policy, wherein the policy comprises a cognitive algorithm for determining the next simulated transaction iteration, wherein the policy comprises a plurality of decision making probabilities for adjusting one or more transaction factors associated with the next transaction iteration, wherein the cognitive algorithm and the intelligent agent comprise a cognitive computer system configured with hardware and/or software to emulate human cognitive functions;

comparing, by the environment, the action with the goal, wherein the environment comprises a set of all previous financial transactions conducted by the intelligent agent;

providing, by the environment, a statistical positive or negative feedback associated with the action based on a degree of similarity of each transaction iteration relative to the goal; and adjusting, by the policy engine, the policy, wherein the adjusting comprises adjusting one of the plurality of decision making probabilities, wherein the adjustments are based on the feedback and configured to gain a superior positive feedback from the next action.

2. The method as recited in claim 1, wherein the clustering algorithm comprises an unsupervised clustering approach.

3. The method as recited in claim 1, wherein each simulated transaction includes one or more of transaction type, transaction amount, transaction time, transaction location, transaction medium, and a second party associated with the simulated transaction.

4. The method as recited in claim 1, further comprising: adding, by the processor, the action in a present iteration into the environment.

5. The method as recited in claim 1, further comprising: removing, by the processor, a plurality of previous actions having the degree of similarity lower than a second predefined threshold.

6. A computer program product for simulating financial transactions using a reinforcement learning model including an intelligent agent, a policy engine, and an environment, the computer program product comprising a non-transitory computer readable storage medium having program instructions embodied therewith, the program instructions executable by a processor to cause the processor to:
receive, by the processor, from a financial institution, customer transaction data;
extract, by the processor using a clustering algorithm, from the customer transaction data, standard customer transaction behaviors, wherein the behaviors comprise a plurality of attributes of a group of customers having similar transaction characteristics as a goal, wherein each member of the group of customers has similar financial, demographic, and geographic attributes, wherein the goal comprises a plurality of transaction factors comprising statistical data, wherein each customer in the group of customers is represented by an artificial customer profile randomly generated from actual customer profile data;
randomly associate, by the processor, each standard transaction behavior with one of the artificial customer profiles; and
perform, by the processor, for each artificial customer profile, a plurality of transaction iterations to simulate the standard customer transaction behavior, wherein each iteration comprises a financial transaction associated with each artificial customer profile having randomly generated transaction factors, wherein the plurality of iterations is performed until a degree of similarity of simulated transaction data relative to the standard customer transaction behavior is higher than a first predefined threshold, wherein the threshold is defined by a range of values for the transaction factors for each iteration; wherein each iteration comprises:
conduct, by the intelligent agent, an action including a plurality of simulated transactions executed during a defined time period and in accordance with a policy, wherein the policy comprises a cognitive algorithm for determining the next simulated transaction iteration, wherein the policy comprises a plurality of decision making probabilities for adjusting one or more transaction factors associated with the next transaction iteration, wherein the cognitive algorithm and the intelligent agent comprise a cognitive computer system configured with hardware and/or software to emulate human cognitive functions;
compare, by the environment, the action with the goal, wherein the environment comprises a set of all previous financial transactions conducted by the intelligent agent;
provide, by the environment, a statistical positive or negative feedback associated with the action based on a degree of similarity of each transaction iteration relative to the goal; and
adjust, by the policy engine, the policy, wherein the adjusting comprises adjusting one of the plurality of decision making probabilities, wherein the adjustments are based on the feedback and configured to gain a superior positive feedback from the next action.

7. The computer program product of claim 6, wherein the clustering algorithm comprises an unsupervised clustering approach.

8. The computer program product of claim 6, wherein each simulated transaction includes one or more of transaction type, transaction amount, transaction time, transaction location, transaction medium, and a second party associated with the simulated transaction.

9. The computer program product of claim 6, wherein the program instructions executable by the processor further cause the processor to add the action into the environment.

10. The computer program product of claim 6, wherein the program instructions executable by the processor further cause the processor to remove a plurality of previous actions having the degree of similarity lower than a second predefined threshold.

11. A system for simulating financial transactions using a reinforcement learning model including an intelligent agent, a policy engine, and an environment, the system comprising:
a processor configured to:
receive, from a financial institution, customer transaction data;
extract, using a clustering algorithm, from the customer transaction data, standard customer transaction behaviors, wherein the behaviors comprise a plurality of attributes of a group of customers having similar transaction characteristics as a goal, wherein each member of the group of customers has similar financial, demographic, and geographic attributes, wherein the goal comprises a plurality of transaction factors comprising statistical data, wherein each customer in the group of customers is represented by an artificial customer profile randomly generated from actual customer profile data;
randomly associate, by the processor, each standard transaction behavior with one of the artificial customer profiles; and
perform, by the processor, for each artificial customer profile, a plurality of transaction iterations to simulate the standard customer transaction behavior, wherein each iteration comprises a financial transaction associated with each artificial customer profile having randomly generated transaction factors, wherein the plurality of iterations is performed until a degree of similarity of simulated transaction data relative to the standard customer transaction behavior is higher than a first predefined threshold, wherein the threshold is defined by a range of values for the transaction factors for each iteration; wherein each iteration comprises:
conduct, by the intelligent agent, an action including a plurality of simulated transactions executed during a defined time period and in accordance with a policy, wherein the policy comprises a cognitive algorithm for determining the next simulated transaction iteration, wherein the policy comprises a plurality of decision making probabilities for adjusting one or more transaction factors associated with the next transaction iteration, wherein the cognitive algorithm and the intelligent agent comprise a cognitive computer system configured with hardware and/or software to emulate human cognitive functions;

compare, by the environment, the action with the goal, wherein the environment comprises a set of all previous financial transactions conducted by the intelligent agent;

provide, by the environment, a statistical positive or negative feedback associated with the action based on a degree of similarity of each transaction iteration relative to the goal; and adjust, by the policy engine, the policy, wherein the adjusting comprises adjusting one of the plurality of decision making probabilities, wherein the adjustments are based on the feedback and configured to gain a superior positive feedback from the next action.

12. The system of claim 11, wherein each simulated transaction includes one or more of transaction type, transaction amount, transaction time, transaction location, transaction medium, and a second party associated with the simulated transaction.

13. The system of claim 11, wherein the processor is further configured to add the action into the environment.

14. The system of claim 11, wherein the processor is further configured to remove a plurality of previous actions having the degree of similarity lower than a second predefined threshold.

* * * * *